H. GIBBS.
HOSE BAND.
APPLICATION FILED FEB. 6, 1908.
1,040,926.
Patented Oct. 8, 1912.
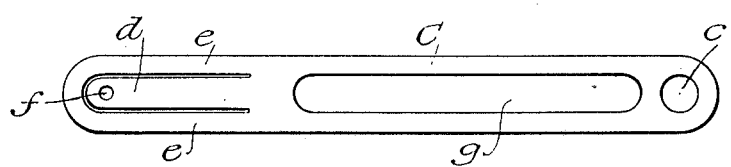
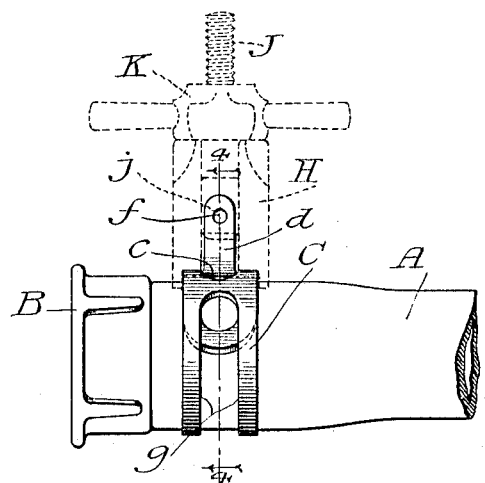
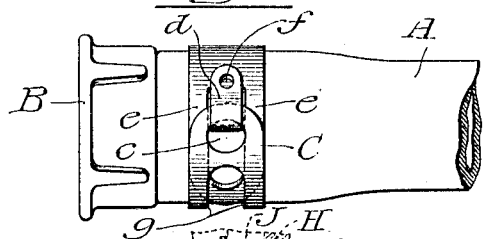
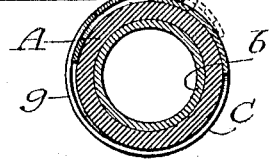

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-BAND.

1,040,926.  Specification of Letters Patent.  Patented Oct. 8, 1912.

Application filed February 6, 1908. Serial No. 414,528.

*To all whom it may concern:*

Be it known that I, HENRY GIBBS, a citizen of the United States, and a resident of Chicago, in the county of Cook and State of Illinois, have invented certain new and useful Improvements in Hose-Bands, of which I do declare the following to be a full, clear, and exact description, reference being had to the accompanying drawings, forming part of this specification.

The present invention has relation more particularly to that class of hose bands adapted for securely uniting rubber hose to the couplings attached to the ends thereof.

The invention consists in the novel features of construction hereinafter described, illustrated in the accompanying drawing and particularly pointed out in the claim at the end of this specification.

Figure 1 is a plan view showing in extended position a hose band embodying the present invention. Fig. 2 is a view in side elevation showing one end of a section of hose fitted with a coupling and with a hose band embodying my invention applied thereto, a device for tightening the hose band being indicated in dotted lines. Fig. 3 is a view in elevation similar to Fig. 2, but showing the retaining tongue of the hose band turned to locked position. Fig. 4 is a view in vertical section on line 4—4 of Fig. 2.

Referring to the accompanying drawing, A designates the rubber hose in one end of which is inserted a reduced portion of a hose coupling B and C designates my improved hose band for retaining the hose A in position upon the coupling B.

My improved hose band is shown as formed from a sheet metal strip. At one end the band C is provided with a hole $c$ and adjacent its opposite end is a locking tongue $d$ which, as shown, is formed integral with the body of the band C, the free end of the tongue $d$ extending to a point adjacent the end of the body C of the band. The parts $e$ of the band C which lie on each side of the tongue $d$, are connected together at their outer ends, as shown. In the end of the tongue $d$ is formed a hole $f$ adapted to receive a suitable tightening device by which the band will be tightly drawn about the hose. Preferably, the body C of the band is formed with an open space $g$ to insure a more rigid binding of the band upon the hose.

When the band C is to be applied for use, it will be placed about that part of the hose that sets over the shank $b$ of the coupling B, and the end portion of the band C having the hole $c$ therein will be lapped over the opposite end portions $e$ $e$ and $f$, the tongue $d$ being directly upward through the hole $c$. Through the hole $f$ of the tongue $d$ will then be passed a suitable pin or projection of a tightening device by which the tongue $d$ may be drawn upward through the hole $c$, thereby causing the band to be tightly drawn about the hose. In dotted lines in Figs. 2 and 4 I have illustrated one form of band tightening device which forms the subject-matter of an application filed by me of even date herewith in the United States Patent Office, although it will be readily understood that any other suitable form of band tightener may be used for drawing the tongue $d$ through the hole $c$. In this form of band tightener, indicated by dotted lines in Figs. 2 and 4, there is a body portion H that bears upon the band, this body portion being provided with a vertically movable screw J that is fitted with a nut K, and the screw carries at its lower end a projecting pin $j$ adapted to enter the hole $f$ in the end of the tongue $d$, as shown in Fig. 4. By turning the nut K, the screw will be caused to move in upward direction, carrying with it the pin $j$ which in turn draws the tongue $d$ upward through the hole $c$ of the band C. As the tongue end of the band underlies the opposite end, it tends to resist the radial pull brought upon the tongue in tightening the band and is moved in circumferential direction by such radial pull. When the band is thus drawn snugly around the hose, the tightener will be removed and the tongue $d$ will then be turned backward upon itself, as indicated in Fig. 3 of the drawing, so as to firmly lock the band in position for use.

By forming the band so that its perforated end shall overlap and bear upon the opposite end of the band, the band can be more readily tightened without danger of pinching or marring the surface of the hose A. It is obvious that when it is desired to remove the band from the hose, this can be readily effected by bending the tongue $d$ so that the perforated end of the band may be disconnected therefrom.

Having thus described my invention, what I claim as new, and desire to secure by Letters Patent, is:—

A flexible, sheet metal hose band having an opening at one end, an integral fastening tongue adjacent and extending toward its opposite end, and an integral, U-shaped end portion extending around said tongue, said U-shaped end portion being adapted to extend beneath the opposite end of the band when in position for use, and said tongue being cut away to engage a tightening tool and adapted to extend up through said opening and be reversely bent over the opposite end of the band, substantially as described.

HENRY GIBBS.

Witnesses:
CLARA A. NORTON,
KATHARINE GERLACH.

Copies of this patent may be obtained for five cents each, by addressing the "Commissioner of Patents, Washington, D. C."